US012266325B2

(12) United States Patent
Gage

(10) Patent No.: US 12,266,325 B2
(45) Date of Patent: Apr. 1, 2025

(54) DRUM ACCESSORY

(71) Applicant: Precious CarGo IP Ventures LLC, Rockwall, TX (US)

(72) Inventor: Michael T. Gage, Rockwall, TX (US)

(73) Assignee: Precious CarGo IP Ventures LLC, Rockwall, TX (US)

( * ) Notice: Subject to any disclaimer, the term of this patent is extended or adjusted under 35 U.S.C. 154(b) by 256 days.

(21) Appl. No.: 18/100,174

(22) Filed: Jan. 23, 2023

(65) Prior Publication Data

US 2023/0237979 A1 Jul. 27, 2023

Related U.S. Application Data

(60) Provisional application No. 63/303,161, filed on Jan. 26, 2022.

(51) Int. Cl.

*G10D 13/02* (2020.01)
*G10D 13/14* (2020.01)
*G10D 13/20* (2020.01)
*G10D 13/22* (2020.01)

(52) U.S. Cl.

CPC ............ *G10D 13/14* (2020.02); *G10D 13/02* (2013.01); *G10D 13/20* (2020.02); *G10D 13/22* (2020.02)

(58) Field of Classification Search

CPC ........ G10D 13/14; G10D 13/02; G10D 13/20; G10D 13/22

See application file for complete search history.

(56) References Cited

U.S. PATENT DOCUMENTS

| | | | | |
|---|---|---|---|---|
| 1,420,288 | A | 6/1922 | Baldwin et al. | |
| 4,170,162 | A | 10/1979 | Casavant | |
| 5,159,139 | A | 10/1992 | Beals et al. | |
| 5,864,077 | A | 1/1999 | Gatzen | |
| 7,470,846 | B2 | 12/2008 | May | |
| 7,528,312 | B1 * | 5/2009 | DiGiovanni | G10D 13/02 84/411 R |
| 7,968,780 | B2 | 6/2011 | Millender, Jr. et al. | |
| 8,294,013 | B2 | 10/2012 | Lento | |
| 9,208,759 | B2 | 12/2015 | Millender, Jr. | |
| 2010/0083812 | A1 | 4/2010 | Peavey | |
| 2010/0175535 | A1 | 7/2010 | Lento | |
| 2017/0287452 | A1 | 10/2017 | Vaida | |

FOREIGN PATENT DOCUMENTS

KR 10-1454223 10/2014

OTHER PUBLICATIONS

Alibaba; "Bass drum pillow bass drum damper muffling pad"; retrieved from https://www.alibab.com on Oct. 23, 2021.

Aliexpress; "MoonEmbassy Bass Drum Pillow Jazz Drum Set Dam per Muffling Tool Accessories"; retrieved from https://www.aliexpress.com on Oct. 23, 2021.

(Continued)

*Primary Examiner* — Kimberly R Lockett

(74) *Attorney, Agent, or Firm* — Robert H. Frantz

(57) ABSTRACT

A stop and dampening pillow are provided inside a bass drum with the dampening pillow engaging the batter head (player's side) but prevented from touching or engaging the resonant head (audience side) by the stop. The stop may be a single piece device, such as a wooden circular segment, or an adjustable device for multiple drum diameter sizes.

10 Claims, 6 Drawing Sheets

(56) References Cited

OTHER PUBLICATIONS

Drum Forum; "Pancake drums"; retrieved from https://www.drumforum.org on Oct. 23, 2021.

Drumhead Authority; Bass Drum Holes: Everything You Need to Know; retrieved from https://drumheadauthority.com on Oct. 23, 2021.

Drum Sauce; "Drum Muffling Basics!"; retrieved from https://draumsauce.com on Oct. 23, 2021.

DW Drums; "Cocktail Kit"; retrieved from https://www.dwdrums.com on Oct. 23, 2021.

Guitar Center; "Remo Dave Weckl Adjustable Bass Drum Muffling System 18 in."; retrieved from https://www.guitarcenter.com on Oct. 23, 2021.

MDU115AssetProduciton; "Research and Reference Images"; retrieved from https://mdu11assetproduciton.wordpress.com on Oct. 23, 2021.

Remo; "Drum Muffling System"; retrieved from https://remo.com on Oct. 23, 2021.

Sweetwater; "Evans EQ Pad Bass Drum Muffler"; retrieved from https://www.sweetwater.com on Oct. 23, 2021.

Third Space Learning; "Parts Of A Circle"; retrieved from https://thirdspacelearning.com on Oct. 23, 2021.

Google Patents; "Muter for base drum" machine translation of Korean Patent KR101454223B1, retrieved from https://patents.google.com/patent/KR101454223B1/en?oq=KR10-1454223 on Jan. 23, 2023.

* cited by examiner

DRUM ACCESSORY

BENEFIT CLAIM OF FILING DATE OF EARLIER-FILED PATENT APPLICATION

This application claims benefit of the filing date of U.S. provisional patent application No. 63/303,161, filed on Jan. 26, 2022, by Michael T. Gage.

FIELD OF THE INVENTION

This invention is related to accessories for drums to alter their performance characteristics, including but not limited to the sound produced and the feel of the instrument when played by a user.

BACKGROUND OF INVENTION

Throughout drumming history, there have been changes in musical styles and how to tune and dampen drums to suit those styles. During the Big Band era of the 1930's-1950's, the bass drum's primary function was to accent the horn section, so the sound produced by bass drums of that era was wide open with little to no damping for maximum volume because there was no sound reinforcement (electronic amplification) in those days. This continued through the mid to late 1960's.

In the early 1970's, studios were being built with isolation booths and close microphone placement techniques were being used. During this period, drummers started putting pillows, blankets, etc. in the bottom of their bass drum to control ring and overtones. This pillow would contact both the batter head (on the drummer's side with the beater) and the front head (towards the audience) if there were a front head. For example, one of the characteristics that set the band Led Zeppelin apart from other bands of the late 1960's to early 1970's was the fact that John Bonham's bass drum was tuned wide open and distance microphone placement was implemented. From that point onward, both schools of thought were employed in the studio and in live performances.

Around the turn of the century into the 2000's, a major drum company introduced a short depth (a.k.a, "pancake" or "woofer") bass drum that could be put in front (on the audience side) of the primary bass drum, with the primary bass drum being dampened and the pancake being wide open and resonant. One could say that the shorter throw (shallower depth) pancake drum was placed in series with the primary bass drum so that the pancake bass drum would sympathetically resonate with the playing of the primary bass drum.

SUMMARY OF THE EXEMPLARY

Embodiments of the Invention

A stop and dampening pillow are provided inside a bass drum with the dampening pillow engaging the batter head (player's side) but prevented from touching or engaging the resonant head (audience side) by the stop. The stop may be a single piece device, such as a wooden circular segment, or an adjustable device for multiple drum diameter sizes.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF ONE OR MORE

Exemplary Embodiment(s) of the Invention

The present inventor has recognized and solved several unrecognized and unsolved problems in the art regarding dampening bass drums, such as the tandem "pancake" or "woofer" arrangements described in the foregoing paragraphs. One of the problems with this design was there was not enough energy put forth by the primary bass drum to adequately excite the pancake bass drum at a proper volume without putting a microphone in front of the pancake bass drum, making it a configuration that was not useful for performance venues where microphoning and amplifying the bass drum was useful or desired.

The present inventor, realizing these shortcomings of the products available on the market, has developed and tested a resonance enabling device, potentially to be marketed as Rez-Enabler™, which provides both a dry and a resonant sound from a bass drum at the same time. The device uses an adjustable "stop" to hold the dampening pillow against the batter head (side being hit with a beater) and allows the resonant head (audience side) to freely vibrate. It prevents the dampening pillow from coming into contact with the resonant head, as could happen with the dampening technique without this new device. In a performance or recording situation where there is sound reinforcement, the new device can be used in conjunction with an internally mounted microphone for the batter head, which there are several manufacturers already making, and optionally, a second microphone positioned on the outside of the resonant head.

In at least one embodiment according to the present invention, the stop member will be of a partial circle shape, having an arc-shaped edge that fits an interior of a specific drum size shell and an essentially straight top edge, thereby defining a segment of a circle, and it will have two more tracks which are oriented in a line from the batter head to the resonant head to adjust the depth of dampening. In at least one embodiment, where the tracks attach to the stop member, there may be provided some side-to-side adjustments to accommodate different bass drum diameters/sizes when the stop is of an adjustable size. The dampening pillow can be of any conventional dampening pillow type, or one especially designed for this purpose, such as down-filled, bead-filled, and synthetic-stuffing filled pillows.

Figure 1:
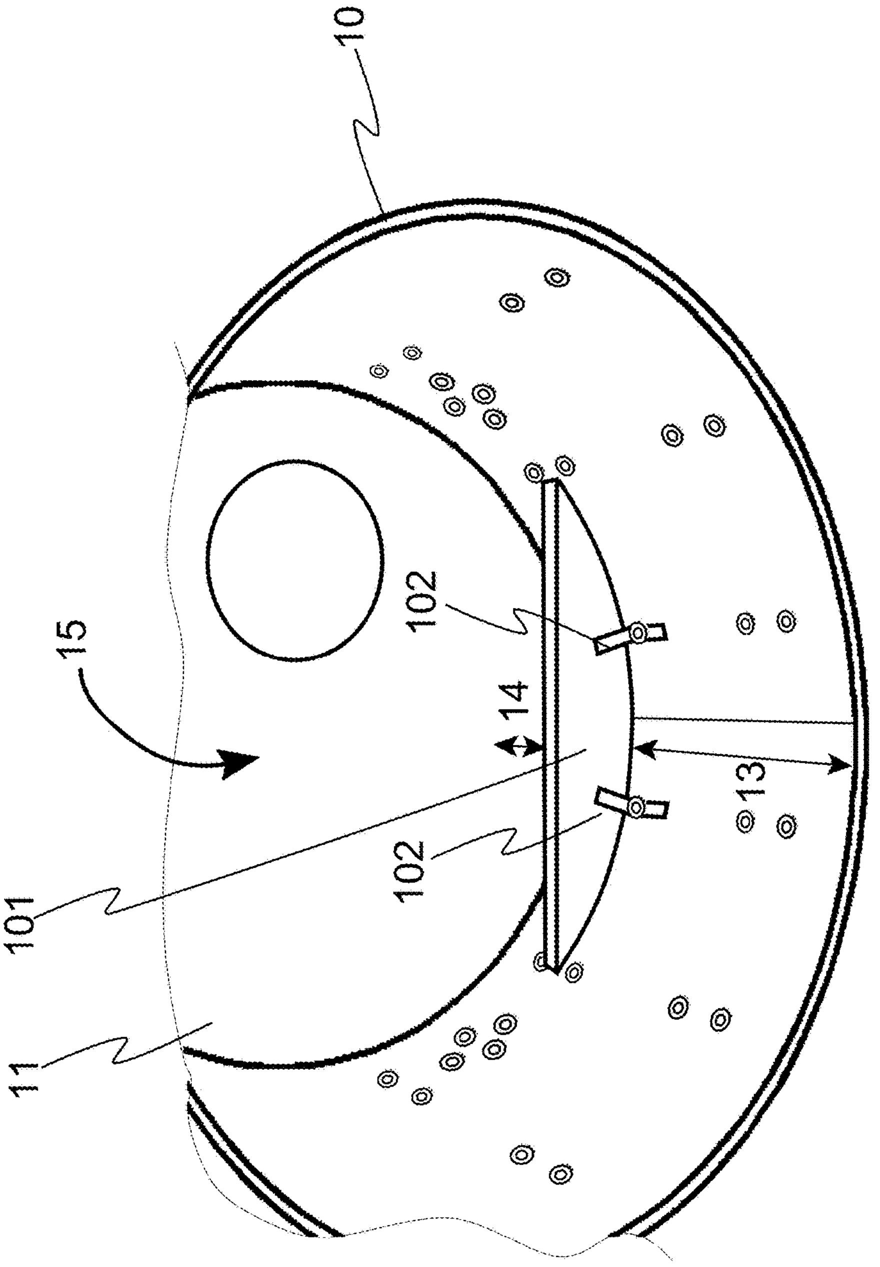
FIG. 1 shows an example embodiment of a stop for a dampening pillow inside a bass drum according to the present invention.

Turning now to FIG. 1, a partial view of a prototype according to the present invention is shown in which a stop 101 in attached 102 to the shell 100 of a typical bass drum in the interior 15. This view is taken from the batter head perspective (player's side) with the batter head removed for illustration. Typically, there are several drum head attachments (not visible in this partial view) around the outside edge of the shell 10 for attaching the heads. The fasteners used to attach these drum head attachments to the shell 10 typically penetrate the shell, with one end of the fastener presenting inside 15 the bass drum. In this example embodiment, these pre-existing fasteners are used to attach 102 brackets which hold the stop 101 firmly in place, without requiring additional drilling into or through the shell 10. Other embodiments may use other attachment devices, such as hook-and-loop fastener strips, removable glue fasteners (e.g., Command available from 3M corporation of Minneapolis, Minnesota), etc.

A dampening pillow reception space 13 is created between the stop 101 and the batter head (not shown in FIG. 1), with a separation space 14 between the stop 101 and the resonant head 11.

Figure 2:
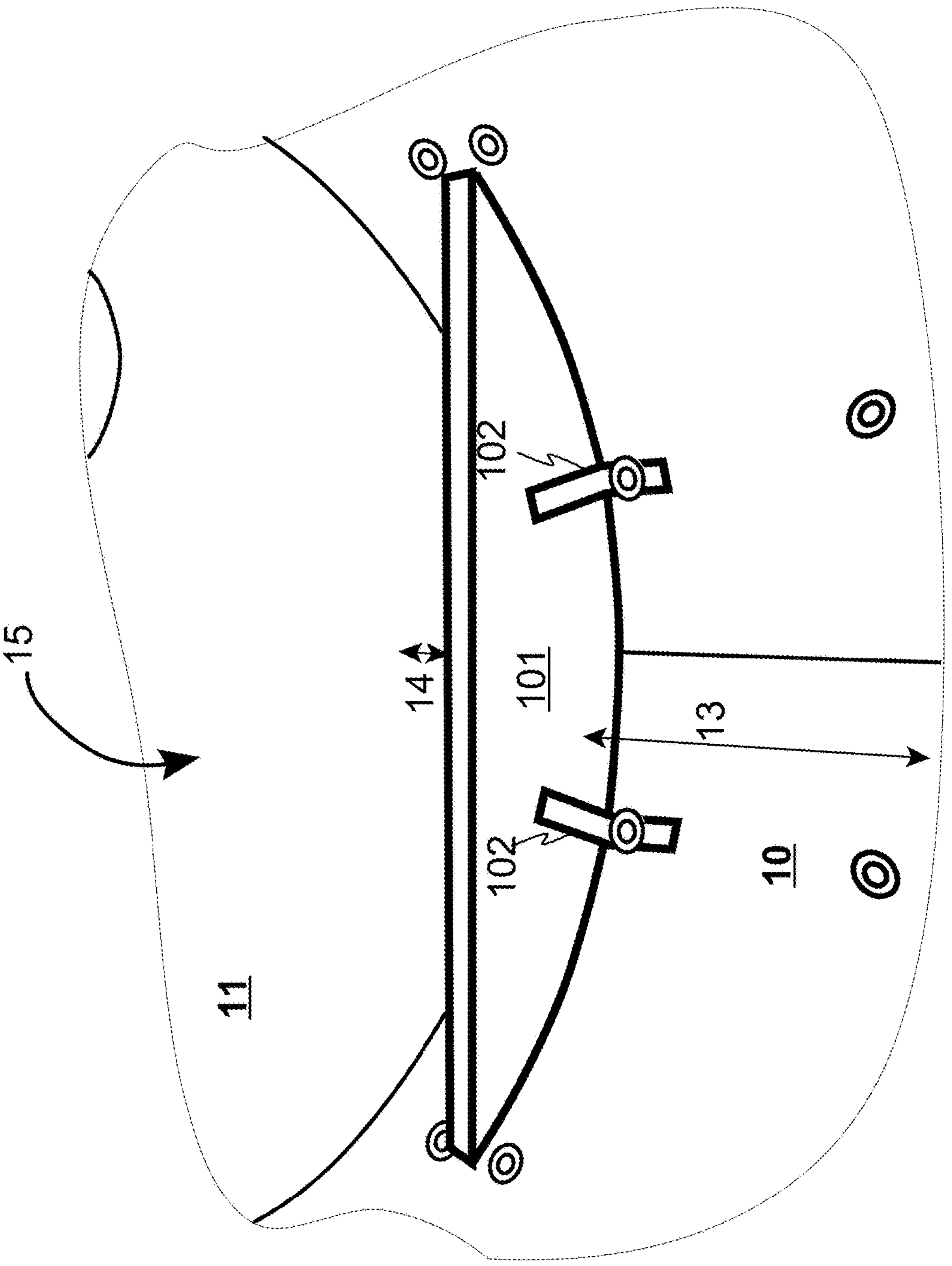
FIG. 2 provides more details of the embodiment of FIG. 1, especially of an example fastener solution.

FIG. 2 shows more details of such a stop 101, which in this example is made from about 1" thick wood and retained 102 using L-brackets secured between the shell 10 and the stop 101 using pre-existing holes and fasteners (bolts, nuts and washers), as shown. In other embodiments, a track at each retainer position running between the two heads and attached to the shell may be employed, and the stop may connect to the tracks to allow for sliding adjustability of the two spaces 13, 14 created between the stop and the heads.

Figure 3:
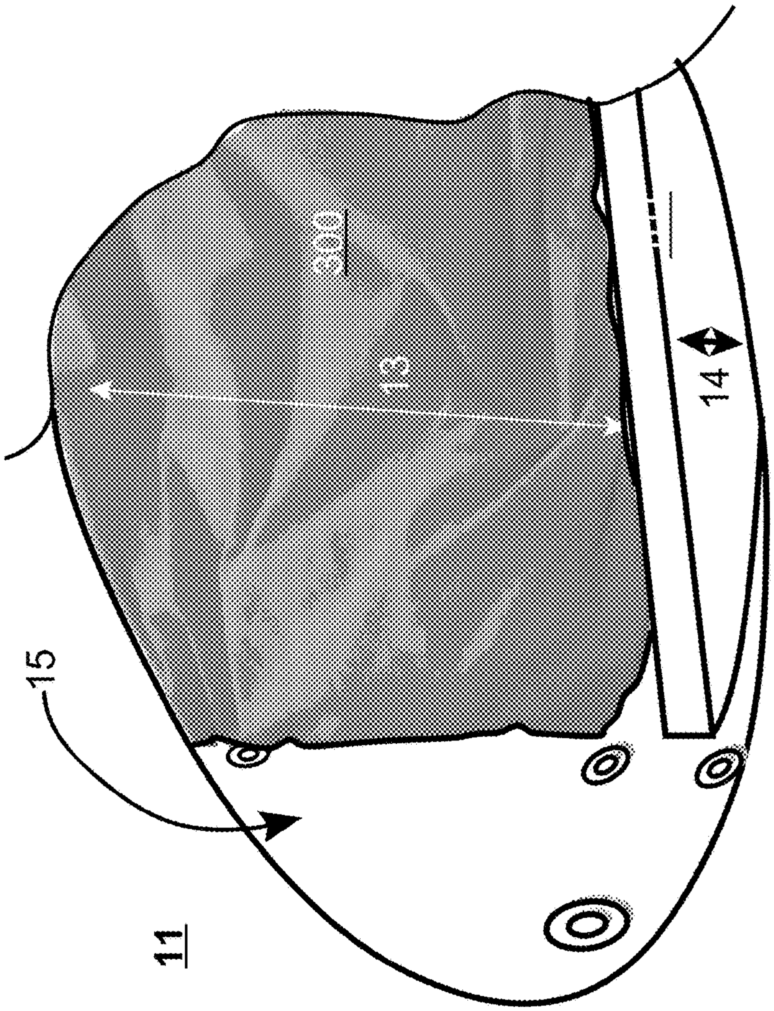
FIG. 3 provides a different view of the embodiments of FIGS. 1 and 2 and also shows how a dampening pillow is hosted between the stop and the batter head of the bass drum.

FIG. 3 provides a perspective of the example prototype shown in FIG. 2 as taken through the port in the resonant head 11, looking down onto a dampening pillow 101 which is received into the dampening pillow reception space 13.

Figure 4:
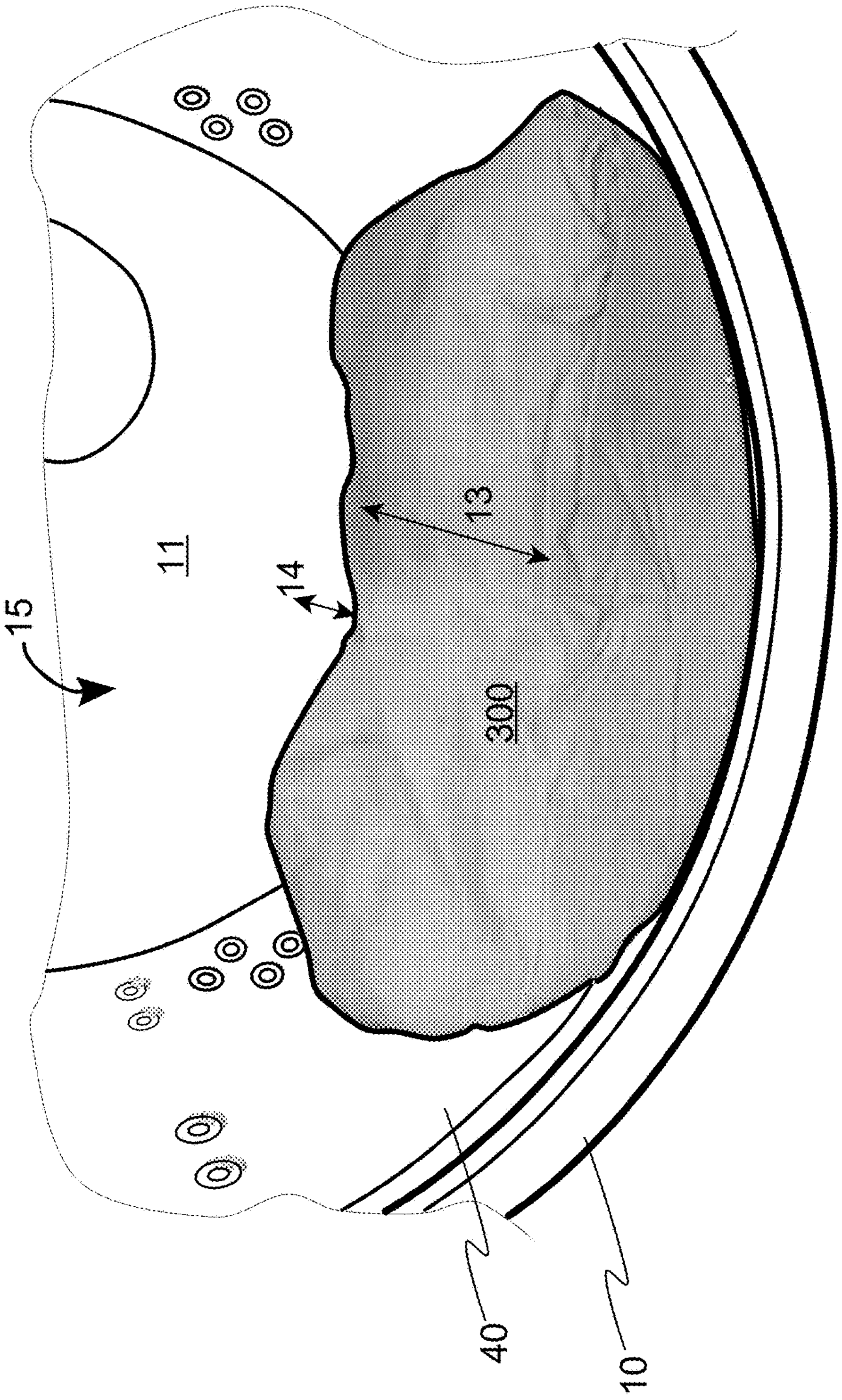
FIG. 4 depicts a view from the batter head of FIG. 3.

FIG. 4 illustrates a complete bass drum with a transparent batter head 40 installed and a resonant dampening pillow 300 received into the space 13 and firmly held against the batter head 40 by the stop (not visible in this view). The pillow is prevented from making physical contact with the resonant head 11 according to the separation space 14.

Figure 5:
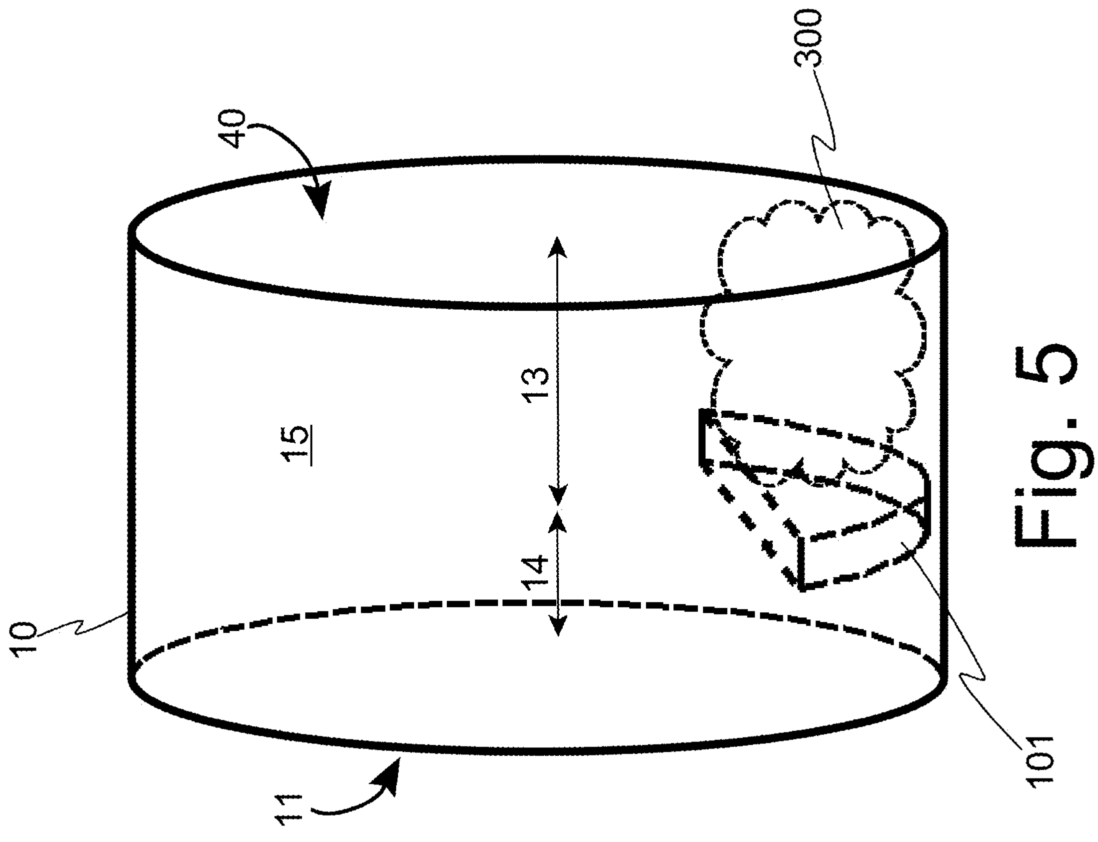
FIG. 5 is a simplified schematic diagram of an arrangement of components according to the present invention.

FIG. 5 provides a simplified schematic of a bass drum in which hidden features are shown in broken (dashed) lines. The shell 10 has a resonant head 11 and a batter head 40, and within its interior volume 15, a stop 101 is affixed to the shell to divide the lower portion into a space 13 for receiving a dampening pillow 300 and pressing the pillow against the batter head, and a space 14 for isolating the resonant head 11 from contacting or being affected by the dampening pillow 300.

Figure 6:
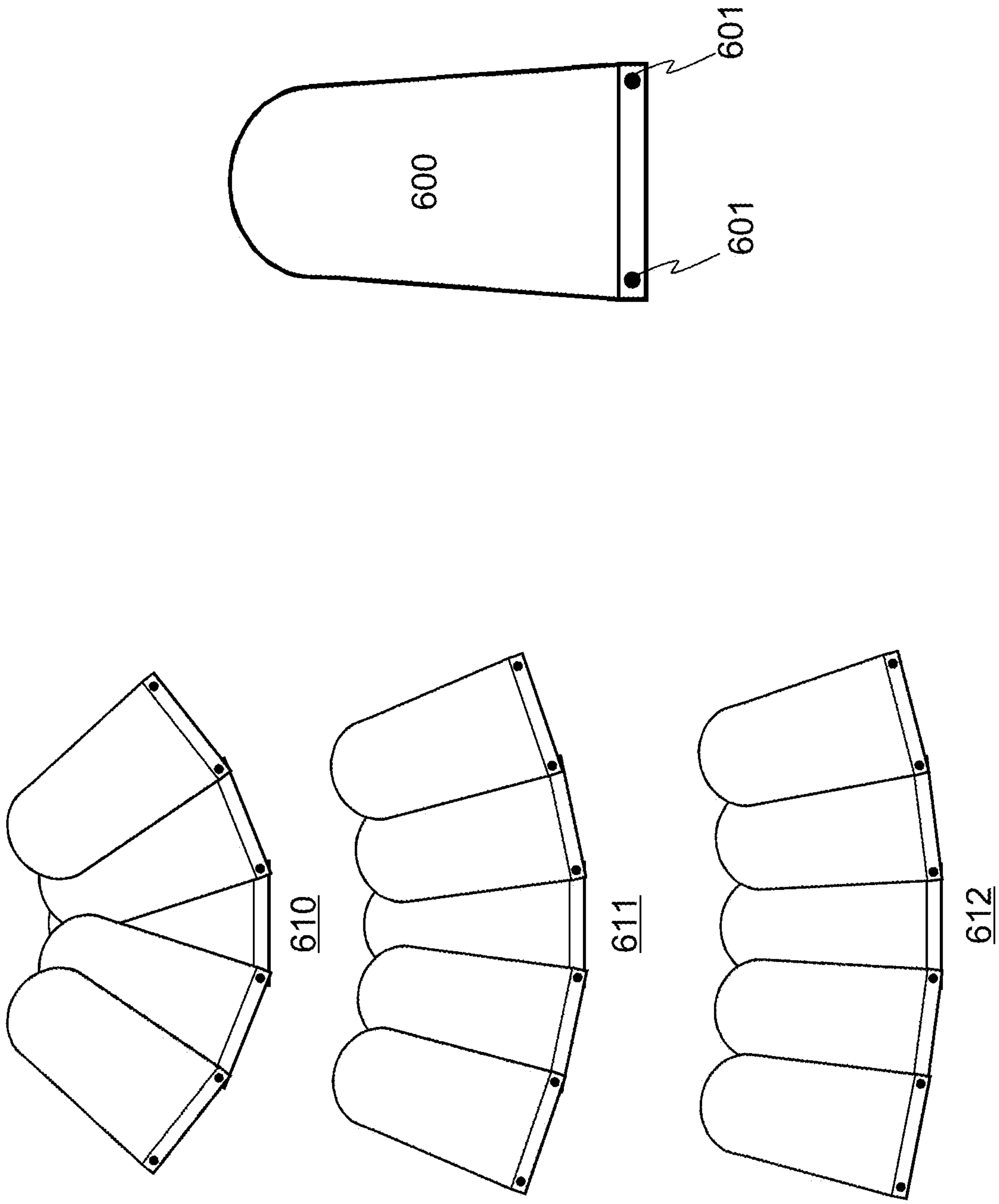
FIG. 6 provides another example embodiment according to the present invention which is universal in fit for a variety of sizes of bass drums.

While the foregoing example embodiment referred to a prototype in which the stop was constructed from wood, other materials may be used to realize the stop such as plastic, composite wood, fiberboard, and metals. The foregoing single-piece segment-shaped embodiment is merely an example within the invention possibilities. Another example embodiment which could be adjustable to fit a plurality of drum sizes is shown in FIG. 6. A plurality of fins or panels 600 are provided connected to a strip, such as by pivoting fasteners 601, so allow curving them to fit into a smaller drum 610, medium size drum 611, or larger size drum 612. This embodiment would allow minimal manufacturing and stocking to satisfy customers with various sizes of drums rather than having a separate model for each size of drum. In another variation of this embodiment, the panels or fins are attached to a single, bendable (flexible) base which would eliminate the need for the pivoting fasteners 601.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

I claim:

1. A resonation enabler device for a bass drum, wherein the bass drum has a cylindrical-shaped shell having a curved inside surface of a first radius, a resonant head on a first side of the shell, and a batter head on a second side of the shell opposite of the resonant head, device comprising:

one or more retainers attached towards a bottom area of the curved inside surface of the shell; and one or more rigid stops rigidly affixed to the one or more retainers, having a minor segment shape defined on a lower edge conformant to the curved inside surface of the shell and defined on an upper edge by a chord across the cylindrical shape;

thereby defining a first horizontal space between the batter head, and portion of the inside surface of the shell, and the one or more rigid stops configured to receive a dampening pillow and to press the dampening pillow firmly against a lower inside surface of the batter head; and defining a second horizontal space between the resonant head, a portion of the inside surface of the shell, and the one or more rigid stops to prevent a dampening pillow or the one or more rigid stops from contacting the resonant head.

2. The resonation enabler device as set forth in claim 1 further comprising a dampening pillow configured to be received into the first horizontal space.

3. The resonation enabler device as set forth in claim 1 wherein the one or more rigid stops comprises a portion of a plank of wood.

4. The resonation enabler device as set forth in claim 1 wherein the one or more rigid stops comprises a portion of a sheet of metal.

5. The resonation enabler device as set forth in claim 1 wherein the one or more rigid stops comprises a plastic material.

6. The resonation enabler device as set forth in claim 1 wherein the one or more rigid stops comprises a plurality of fins connected to a strip, wherein the strip conforms to the curved inside surface of a first radius of the shell.

7. The resonation enabler device as set forth in claim 6 wherein the strip is flexible to allow conformance to a curved inside surface of a second radius of a shell of a larger or smaller drum.

8. The resonation enabler device as set forth in claim 1 wherein the one or more retainers attached to ends of drum head attachments fasteners.

9. The resonation enabler device as set forth in claim 1 wherein the one or more retainers attached by hook-and-loop fasteners adhered to the inside surface of the shell.

10. The resonation enabler device as set forth in claim 1 wherein the one or more retainers comprise one or more tracks attached to the inside surface of the shell, wherein the tracks extend perpendicularly from the batter head, and wherein the retainers adjustably movable along the track to change a containing volume of the first horizontal space to receive larger or smaller dampening pillows and to provide greater or lesser pressure on the batter head.

* * * * *